Sept. 24, 1940.   L. I. NORTHON   2,216,092
DIFFERENTIAL NONRETURN VALVE
Filed April 16, 1937    2 Sheets-Sheet 2

*Louis Irving Northon*

INVENTOR.

Patented Sept. 24, 1940

2,216,092

UNITED STATES PATENT OFFICE 2,216,092

DIFFERENTIAL NONRETURN VALVE

Louis Irving Northon, Washington, D. C.

Application April 16, 1937, Serial No. 137,233

7 Claims. (Cl. 251—129)

This invention relates to valves and particularly to pressure responsive valves. More particularly, the present invention contemplates the provision of an improved structure of a promptly responding nature readily permitting flow of fluid in a designed direction but precluding flow in reverse direction.

In fluid distributing systems of a character designed to supply fluid from a supply main, particularly as applied to water distribution, fluctuations of pressures in supply main are bound to occur. It is readily conceivable that, when water is not being drawn off at the usual tap or other outlets and a pressure drop in distribution main occurs, there may be a backing up of the water in the subsidiary system due to prevailing pressure difference. Obviously, where water is metered and no provision is made for compensation of reverse flow and when the pressure increases again in supply main, that amount of water which has backed up into the main is re-metered. This may recur as often as the main pressure drops and in the course of substantial periods of nonuse of the subsidiary system, may result in unfair supply charges.

Furthermore, when reverse flow occurs from a secondary system, or supply branch, pollution or infection of the main supply results, not a desirable aspect in drinking water distributing systems or in industrial activities where clear, clean water may be essential.

The aforementioned conditions are not restricted to a main and subsidiary system. Where a plurality of subsidiary or secondary systems may be interconnected, or connected to the same main, positive segregation of the individual systems may be desirable.

Accordingly, the primary object of the present invention is the provision of an efficient, promptly responsive nonreverse flow valve which may be readily interposed in a system to eliminate the above objectionable system characteristics of the valve without effecting the normal passage of fluid therethrough. This feature prevents accumulation on or pitting of the valve seat and coacting movable part, thus resulting in elimination of possible reverse flow.

An important, though not so restricted, application will be in hot and cold water supply systems where it is desirable to preclude reverse flow of hot water into the cold water lines. This may be desirable not only in dwellings but in industrial or commercial plants, hospitals, laundries, chemical plants and other institutions whose requirements may run into large quantities.

Other important features and objects of the invention will appear from the following detailed description of a preferred embodiment of the invention illustrated in the accompanying drawings in which.

As indicated above, one of the main purposes of the valve is to relieve hydrostatic pressure from a supply main or pipe but its use is not necessarily limited thereto. It might be readily employed to prevent reverse flow in suction and discharge lines of hydro-turbines; centrifugal, piston and plunger type pumps; vacuum pumps, automatic gas and oil heating supply distributing systems; oil burners, sterilizing and washer arrangements particularly in hospitals; steam and hot water cooling systems, artesian water and oil wells; submerged reservoir connections in industrial chemistry plants, etc.

Figure 1:
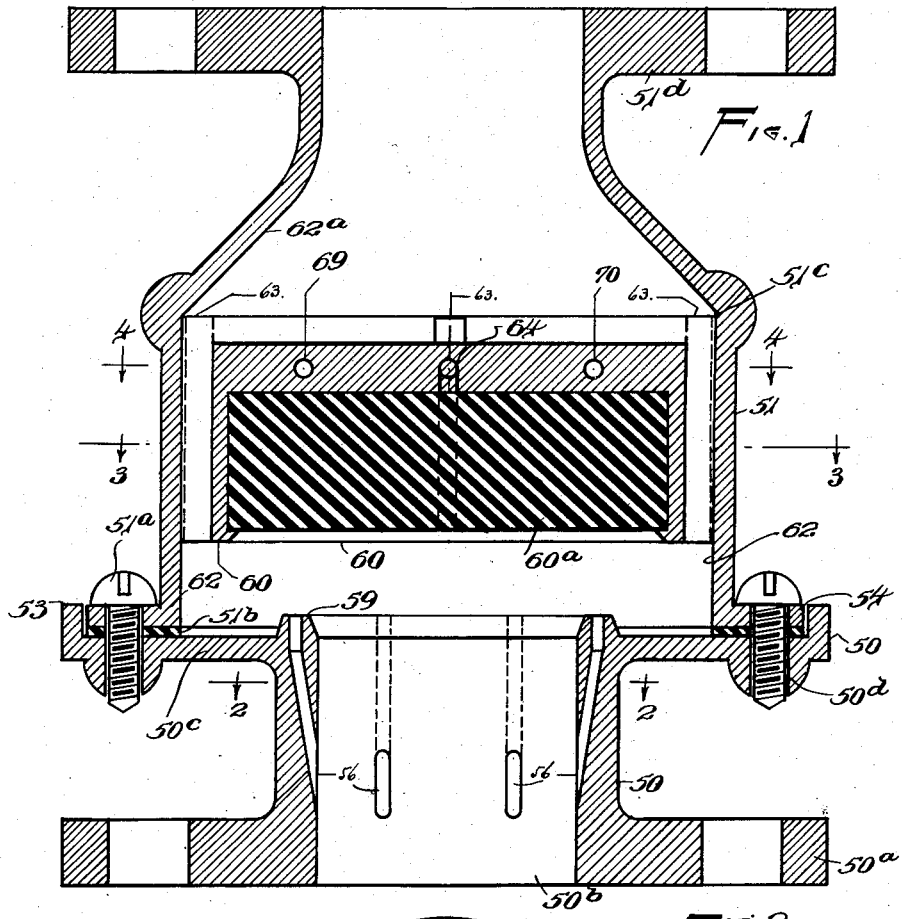
Fig. 1 is a vertical section through a valved body incorporating the aforementioned improved features, showing the valve plug unseated.

Coming now to the valve structure itself as exemplified in the accompanying drawings, the valve is enclosed in a casing or housing comprising preferably two sections, a lower one 50 and a cooperating upper one 51. As shown in Fig. 1, the lower section may have an attaching flange 50ª which may have conventional attachment to a main preferably inwardly of a metering device. While a flanged connection is shown, it is obvious that the conventional threaded connection might be used. This lower section is formed with an axial passage 50ᵇ terminating in an inlet port surrounded by a valve seat 59. Extending radially outwardly from said seat is an attaching flange 50ᶜ terminating in an upstanding flange rim 53. Flange 50ᶜ may have a plurality of threaded sockets 50ᵈ therein. Upper section 51 terminates at its lower edge in a radially outward flange 54 having a plurality of transverse passages for the reception of headed securing elements 51ª which may be received in the sockets 50ᵈ, there being a suitable gasket 51ᵇ clamped between flanges 54 and 50ᶜ when the casing is assembled. The interior wall 62 of the section 51 is preferably smooth providing a sleeve or cylinder spaced somewhat from valve seat 59, the upper end of the section narrowing somewhat to form a neck at 62ª to provide a circular shoulder 51ᶜ and terminating at its upper end in a radial attaching flange 51ᵈ although this may be a threaded portion if desired.

Figure 2:
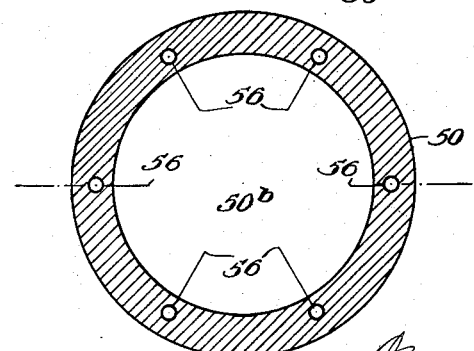
Fig. 2 is a horizontal section of the lower portion of the body taken substantially along the line 2—2 of Fig. 1.

Lower section 50 is provided with a plurality of upwardly directed channels 56 opening into port 50ᵇ and providing discharge ports upwardly through the valve seat 59 as clearly shown in Figs. 1 and 2 for a purpose to be hereinafter described.

Disposed within the cylindrical portion of section 51 is a vertically movable valve element 60 preferably cylindrical in cross-section except as will be more specifically hereinafter pointed out. This element is provided with a seating disk 60ª preferably of hard rubber although it may be of any suitable material depending on fluid or liquid the valve made be required to handle. The disk may be attached to the valve element 60 in any well known or desired manner. On its exterior or periphery, the valve element 60 is provided with a plurality of ribs 63 preferably extending in parallel relation to the axis of the element. As will be apparent from Fig. 1, these ribs extend beyond the upper end of the valve element and since they are adapted to contact the interior wall of the section 51, they will strike and engage the shoulder 51ᶜ when the plug is unseated and vertically raised, thus limiting the extent of upward movement of the valve.

Figure 3:
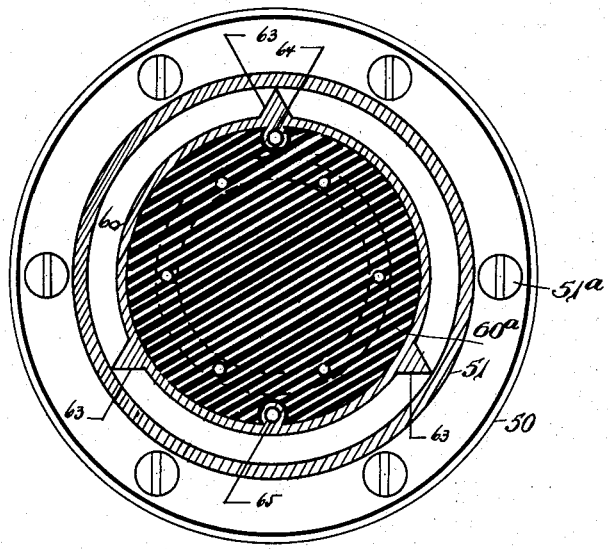
Fig. 3 is a horizontal section through the upper portion of the body taken along the line 3—3 of Fig. 1.
Figure 4:
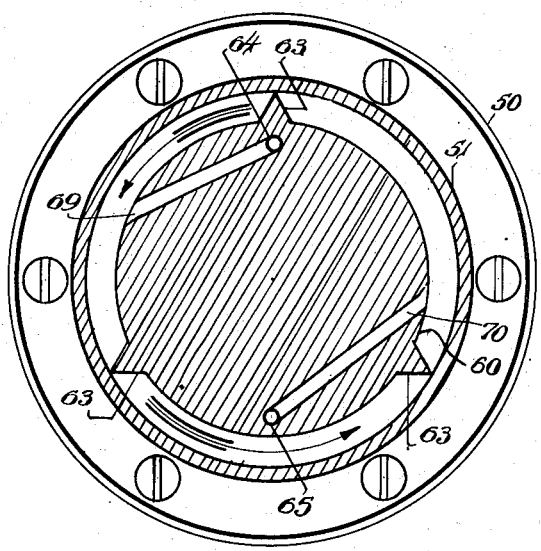
Fig. 4 is a similar section taken slightly higher along the line 4—4 of Fig. 1.

Preferably, ribs 63 are wedge-shaped in cross-section as clearly apparent from Fig. 3, their outer extremities being reduced to practically V-shaped-edges whereby when they contact the inner wall of section 51 only line contact is effected thereby maintaining friction between the valve 60 and the wall 62 at a minimum. Also, these ribs serve to space the major portion of the periphery of the valve between the ribs 63 from the inner wall 62 of section 51, thereby providing a plurality of longitudinally directed chambers through which fluid may flow from the lower inlet port to the upper outlet port. In view of the upward extent of the ribs, the upper part of the valve element is maintained in spaced relation to the narrowed upper neck 62a, thus providing for unrestricted passage of fluid past the valve element.

Element 60 is also provided with one or more vertical channels 64 and 65 extending upwardly from the bottom face of the valve to a point adjacent the top and communicating with horizontal channels 69 and 70, respectively. These channels 69 and 70, while shown adjacent the top of the valve element need not be so disposed. The discharge ends of channels 69 and 70 are disposed nonradially with respect to the axis of the valve element and empty into the chambers formed between the outer periphery of the element and inner wall of the casing and two adjacent wall contacting ribs, and since they discharge fluid at an angle relative to normal flow of fluid vertically through these chambers, the element will be rotated while fluid is passing through the valve. Obviously, the speed of rotation will depend upon the flow rate of the fluid through the valve.

The velocity of flow at the entrance or inlet port 50ᵇ, due to the latter's relatively larger diameter than that of the channels 56, 64, 65, 69 and 70, will create a considerably higher velocity at each channel. The discharge velocity at the end of each channel being way above the velocity of flow through the device, consequently, the pressure difference will create the discussed rotating action of the valve element, since the created hydrodynamic power due to the high velocity at each channel will exert its power on each of the guiding ribs 63. The consequence of such resistance results in the rotation of the valve element 60. A high powered jet action occurs from the nonradial discharge of the fluid from the channels 69 and 70 into the respective chambers due to the created differential of discharge pressure and this jet action converted into hydraulic power is that mechanical work, necessary to impart rotary movement to the valve element 60. The higher the rate of flow through the device, the higher is the pressure drop through the entrance port and due to this, at each channel therefor, the higher will be the number of revolutions of the valve element.

Since the rib contact with the wall is so narrow, both rotational and reciprocatory friction are reduced to a minimum, and in view of the V-shaped-edge extremities of the ribs, the rotation of the element will cause the ribs to exert a self-cleaning action, thus maintaining the interior of the valve free of foreign matter and possible accumulations which might normally tend to adhere to the valve parts in passing through the valve. It should be noted that the lower ends of channels 64 and 65 are beyond the valve seat 59 in the closed position of the valve thereby precluding leakage back into the inlet port.

The channels 56, due to their small diameter relative to the inlet port, provide high velocity jets which will cause rapid unseating of the valve element upon demand and also produce a constant, turbulent flow. At the same time, fluid discharging from these channels will maintain the valve seat clean. Of course, any number of these channels may be employed depending upon the size of the valve, the character of the fluid, etc.

Preferably, the valve parts are formed of materials which readily lend themselves to compensation for expansion variations.

In operation, when fluid flow through the valve ceases, the inlet port and associated channels will be closed, at which time the momentary back pressure at the discharge end coupled with static pressure on the discharge end of the valve, will seat the element. Since the element is rotatable, it does not always reseat at the same spot, thereby materially reducing wear on the valve disk providing for long life operation.

While a preferred embodiment has been disclosed, it is merely exemplary and not intended as limitative except as effected by the scope of the appended claims. Clearly, variations and modifications may be made without departing from the essence and spirit of the invention.

What is claimed and desired to be secured under and in compliance with the patent statutes is:

1. A valve comprising a casing providing a fluid passage including inlet and outlet ports, a reciprocating and rotating valve element arranged in said casing between the ports, said valve element being seated against the inlet port when flow ceases but otherwise unseated, vertically arranged guides on said valve element adapted to contact with the inner wall of the casing, said guides forming a plurality of chambers between the valve element and the inner wall of the casing, and channels constructed and arranged in the valve element to cause jets of fluid to be discharged into the chambers and against the side faces of the guides to create a rotation of the valve element during flow of the fluid through said passage.

2. A valve comprising a casing providing a fluid passage including inlet and outlet ports, a seat adjacent the inlet port, a freely movable valve element arranged in the casing and normally maintained in position on the seat when flow ceases but otherwise unseated, vertically arranged guides on the valve element spacing the latter from the inner wall of the casing, each of said guides tapering toward its outer edge and adapted to contact the inner wall of the casing, said guides providing a plurality of chambers between the valve element and the casing, and channels constructed and arranged in the valve element to cause jets of fluid to be discharged into the chambers and against the guides to impart a rotary movement to the valve element during the flow of the fluid through the valve.

3. A valve comprising a casing providing a fluid passage including inlet and outlet ports, a seat adjacent the inlet port, a freely movable valve element arranged in the casing and normally maintained in position on the seat when flow ceases but otherwise unseated, tapered ribs arranged vertically on the periphery of the valve element spacing the latter from the inner wall of the casing, the outer edges of the tapered ribs terminating in scraping edges adapted to contact the inner wall of the casing, said ribs providing a plurality of chambers between the valve element and the casing, and channels constructed and arranged in the valve element to cause jets of fluid to be discharged into the chambers and against the ribs to impart a rotary movement to the valve element during the flow of the fluid through the valve, the aforesaid scraping edges of the ribs adapted to produce a scraping action on the inner wall of the casing to render the valve self-cleaning during rotation of the valve element.

4. A valve comprising a casing providing an axial passage therethrough including an intake port having a valve seat and an outlet port, a valve element mounted for reciprocatory and rotary movement in the casing, said valve element being normally held in position on said seat when flow ceases but otherwise unseated, a plurality of vertical ribs extending radially from the periphery of the valve element and adapted to contact the inner wall of the casing for guiding said valve element in its seating and unseating movements, said ribs providing a plurality of chambers between the inner wall of the casing and the periphery of the valve element, and angular channels extending from the bottom of the valve element to the periphery thereof and terminating in nonradial discharge outlets at the periphery of the valve element, said channels adapted to discharge jets of fluid into the chambers and against the sides of the ribs to impart nonrotary movement to the valve element during the flow of the fluid through the valve.

5. A valve comprising a casing enclosing a substantially cylindrical passage including a main liquid entrance port surrounded by a seat and a plurality of restricted entrance passages branching off of said main entrance port and discharging through said seat and an outlet port, a valve element mounted for free movement within the casing, vertical guides projecting from the periphery of the valve element adapted to contact the inner wall of the casing, a pad of resilient material carried by the valve element and being normally held in position on said seat when flow ceases but otherwise unseated, angular restricted channels arranged in the valve element and having nonradial discharge outlets terminating at the periphery of the valve element for delivering jets of fluid under high velocity from the entrance port out to the periphery of the valve element and against the sides of the guides to impart a rotary movement to the valve element during the flow of the fluid through the valve.

6. A valve comprising a casing providing an axial passage therethrough including an intake port having a valve seat and an outlet port, a valve element mounted for reciprocatory and rotary movement in the casing, said valve element being normally held in position on said seat when flow ceases but otherwise unseated, a plurality of spaced vertical ribs projecting radially outwardly from the valve element and adapted to contact the inner wall of the casing for guiding the valve element in its seating and unseating movements, said ribs providing a plurality of chambers between the inner wall of the casing and the periphery of the valve element, restricted channels extending upwardly from the bottom face of the valve element, additional restricted channels arranged substantially horizontally in the upper portion of the valve element and communicating with the respective first mentioned restricted channels, the outer ends of the horizontally disposed restricted channels terminating in nonradial discharge outlets at the periphery of the valve element, and adapted to discharge jets of fluid into the chambers and against the sides of the ribs to impart a rotary movement to the valve element during the flow of fluid through the valve.

7. A valve comprising a casing having an axial passage therethrough including a main liquid entrance port surrounded by a seat and a plurality of restricted liquid entrance passages branching off of said main entrance port and discharging through said seat and an outlet port, a valve element mounted for reciprocatory and rotary movement in the casing, said valve element being normally held in position on said seat when flow ceases but otherwise unseated, a plurality of spaced vertical ribs projecting radially outwardly from the valve element and adapted to contact the inner wall of the casing for guiding the valve element in its seating and unseating movements, said ribs providing a plurality of chambers between the inner wall of the casing and the periphery of the valve element, restricted channels extending upwardly from the bottom face of the valve element, additional restricted channels arranged substantially horizontally in the upper portion of the valve element and communicating with the respective first mentioned restricted channels, the outer ends of the horizontally disposed restricted channels terminating in nonradial discharge outlets at the periphery of the valve element, and adapted to discharge jets of fluid into the chambers and against the sides of the ribs to impart a rotary movement to the valve element during the flow of fluid through the valve.

LOUIS I. NORTHON.